(12) United States Patent
Thoms

(10) Patent No.: US 7,944,107 B2
(45) Date of Patent: May 17, 2011

(54) SYNCHRONOUS PERMANENT MAGNET MACHINE

(76) Inventor: Michael Thoms, Bietigheim-Bissingen (DE)

( * ) Notice: Subject to any disclaimer, the term of this patent is extended or adjusted under 35 U.S.C. 154(b) by 0 days.

(21) Appl. No.: 12/493,711

(22) Filed: Jun. 29, 2009

(65) Prior Publication Data
US 2009/0309443 A1  Dec. 17, 2009

Related U.S. Application Data

(63) Continuation of application No. PCT/EP2007/011308, filed on Dec. 21, 2007.

(30) Foreign Application Priority Data

Dec. 29, 2006 (DE) .......................... 10 2006 062 613

(51) Int. Cl.
*H02K 16/00* (2006.01)
(52) U.S. Cl. ........................................ 310/114; 310/266
(58) Field of Classification Search .......... 310/112–114, 310/156.37, 266
See application file for complete search history.

(56) References Cited

U.S. PATENT DOCUMENTS

| | | | | |
|---|---|---|---|---|
| 4,532,447 A | * | 7/1985 | Cibie | 310/114 |
| 5,124,606 A | * | 6/1992 | Eisenbeis | 310/114 |
| 6,049,152 A | * | 4/2000 | Nakano | 310/114 |
| 6,121,705 A | * | 9/2000 | Hoong | 310/113 |
| 6,211,597 B1 | * | 4/2001 | Nakano | 310/266 |
| 6,304,017 B1 | * | 10/2001 | Leupold | 310/115 |
| 6,373,160 B1 | | 4/2002 | Schrödl | |
| 6,639,337 B1 | | 10/2003 | Nakano | |
| 2004/0119373 A1 | | 6/2004 | Akatsu | |
| 2006/0066173 A1 | | 3/2006 | Kim et al. | |

FOREIGN PATENT DOCUMENTS

| | | |
|---|---|---|
| DE | 199 03 977 A1 | 8/2000 |
| DE | 101 01 377 A1 | 7/2002 |
| DE | 600 24 383 T2 | 6/2006 |
| EP | 1 024 585 A2 | 8/2000 |
| EP | 1 087 501 A2 | 3/2001 |
| WO | 99/39426 A1 | 8/1999 |

OTHER PUBLICATIONS

International Search Report, dated Apr. 16, 2008.

* cited by examiner

*Primary Examiner* — Thanh Lam
(74) *Attorney, Agent, or Firm* — Laurence A. Greenberg; Werner H. Stemer; Ralph E. Locher

(57) ABSTRACT

A synchronous permanent magnet machine for at least two rotation speeds has a single stator and at least two rotors. For each rotation speed there is provided a separate rotor with a different numbers of poles. The armature windings on the stator extend across all of the rotors and the windings are subjected to a rotating field with the same frequency.

12 Claims, 8 Drawing Sheets

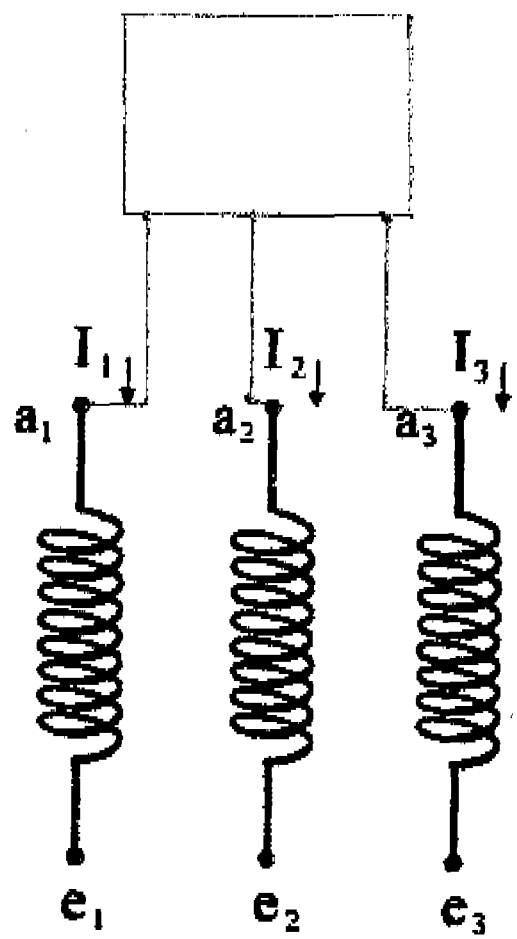
FIG. 9A₁

FIG. 9A$_2$
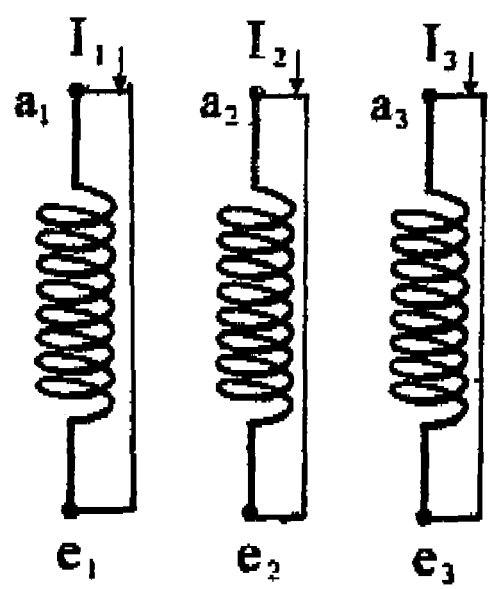

FIG. 9A₃
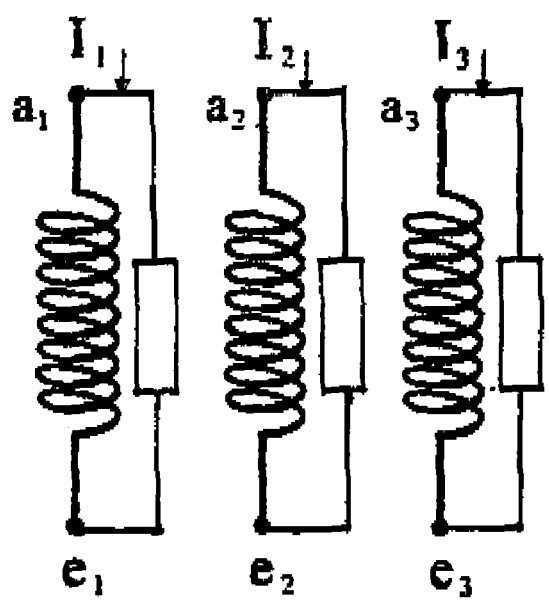

SYNCHRONOUS PERMANENT MAGNET MACHINE

CROSS-REFERENCE TO RELATED APPLICATION

This is a continuation, under 35 U.S.C. §120, of copending international application No. PCT/EP2007/011308, filed Dec. 21, 2007, which designated the United States; this application also claims the priority, under 35 U.S.C. §119, of German patent application No. DE 10 2006 062 613.3, filed Dec. 29, 2006; the prior applications are herewith incorporated by reference in their entirety.

BACKGROUND OF THE INVENTION

Field of the Invention

The present invention relates to a synchronous permanent magnet machine.

Electric motors in which the primary speed of rotation of the motor shaft is reduced or increased by a downstream gear mechanism are described in German patent specification DE 199 03 977. Since mechanical parts are in engagement in those downstream gear mechanisms, the parts are subject to wear which can cause problems. The present invention addresses the problem of generating at least two rotation speeds in an electric machine without a gear mechanism and with compact design.

U.S. Pat. No. 6,639,337 (cf. DE 600 24 383 T2) discloses, in the case of a synchronous machine which is provided with two rotors that are fitted with permanent magnets, supplying power to the coils of the two stator winding groups independently of one another.

The motors with two speeds according to the invention have a wide range of use in the art. For example, they can advantageously be used to generate negative pressure and separate air/liquid/solid mixtures. In this case, it is known that high rotation speeds of approximately 10,000 to 15,000 rpm have to be generated with the aid of a radial blower in order to generate a negative pressure of, say, 160 mbar. However, if it is desirable to separate the solid fraction from the liquid fraction and, in turn, the liquid fraction from the air fraction using a centrifugal separator at the same time, rotation speeds of the order of magnitude of 4000 rpm are required, so that, for example, foaming of the mixture in the separator is prevented, this foam otherwise being aspirated by a downstream suction machine. To date, such machines have been designed with two separate motors. On account of the motor with two rotation speeds according to the invention, these machines can be designed at low cost and in a compact fashion.

SUMMARY OF THE INVENTION

It is accordingly an object of the invention to provide a synchronous permanent magnet machine, which overcomes the above-mentioned disadvantages of the heretofore-known devices and methods of this general type.

With the foregoing and other objects in view there is provided, in accordance with the invention, a synchronous permanent magnet machine, comprising:

a single stator carrying stator windings;

at least two rotors for at least two rotation speeds of the machine, each of said rotors defining a separate rotation speed, and each of said rotors carrying permanent magnets with different numbers of poles;

said stator windings of said single stator extending over all of said rotors; and means connected to said windings for subjecting the armature windings to a rotating field of a common frequency.

In accordance with an added feature of the invention, at least one permanent magnet segment and at most p/2 permanent magnet segments of the same polarity are replaced by segments comprising a dia- or ferromagnetic material of high permeability, where p is the pole number of the rotor.

In accordance with an additional feature of the invention, the machine is configured with a rotor of external rotor design, the 2n-pole bell which is associated with the low rotation speed has a single magnet which is connected at one end to the soft-magnetic bell which ends in n regularly offset yokes, and at the other end rests against the lug of a soft-magnetic ring which has n−1 further lugs at 360/n° which are supported against the inside of the bell on non-magnetic lining elements.

In accordance with another feature of the invention, the shafts that are connected to the bells are designed as hollow shafts with at least one row of holes, and means are provided for ventilating the stator windings.

In accordance with a further feature of the invention, the stator yokes are formed with recessed regions, i.e., regions into which the stator yokes spring back, and the regions are lined with non-magnetic material.

In accordance with again an added feature of the invention, the stator yokes and the rotor magnets are helical.

In accordance with again an additional feature of the invention, the stator is connected up such that it has the same absolute magnetization on its opposite side.

In accordance with yet an added feature of the invention, there is provided a combination of the apparatus as summarized above in a radial suction machine with a centrifugal separator which is mounted on the low-speed side, while the radial fan impeller is mounted on the high-speed side.

In accordance with yet another feature of the invention, there is provided the foregoing machine in combination with a brushless controller for supplying current to the stator windings.

In accordance with a concomitant feature of the invention, the stator windings are short-circuited or connected by a low-value resistor.

Other features which are considered as characteristic for the invention are set forth in the appended claims.

Although the invention is illustrated and described herein as embodied in a synchronous permanent magnet machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 9A$_1$ is a partly schematic illustration showing details of a brushless controller for supplying current to the stator coils;

FIG. 9A$_2$ is a partly schematic illustration showing details of stator coils being short circuited to one another;

FIG. 9A$_3$ is a partly schematic illustration showing details of stator coils being connected by way of a low-value resistor.

DETAILED DESCRIPTION OF THE INVENTION

Synchronous motors with a stator and a permanent magnet rotor have a rotation speed $f_M$ (speed, for short) which is given by the drive frequency of the windings $f_w$ multiplied by 2/p, where p is the magnetic pole number of the rotor. Theoretically, it follows that different speeds can be generated with each chosen pole number p of the rotor.

Figure 1:
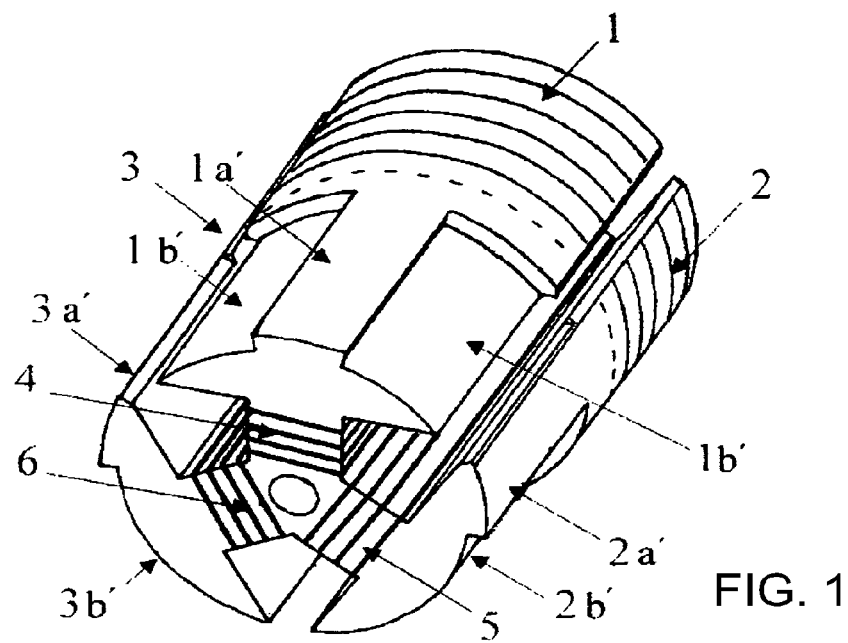
FIG. 1 is a perspective view of an exemplary embodiment of a winding core according to the invention which is driven in three phases and has a two-pole and a six-pole permanent magnet rotor.

Referring now to the figures of the drawing in detail and first, particularly, to FIG. 1 thereof, there is shown, in the first instance, the stator of a winding core which is driven in three phases and is made up of individual stator laminates in order to prevent eddy currents in the customary manner. Only some of the stator laminates are illustrated at the rear end for reasons of clarity. The winding core comprises the yokes 1, 2, 3 and the yokes 1a', 2a', 3a'. The yoke 1a' is formed in the center of the yoke 1 and is produced by cutouts (1b') at the ends of the yoke 1. The size of the effective air gap is increased by virtue of these cutouts, and so magnetic flux passes only in the region of the pole 1a'. The same applies to pole yokes 2a' and 3a'. In this case, the angle between the central yoke 1a' and the yokes 2a' and 3a' which are adjacent to said yoke 1a' is less than 120°. A three-phase winding, comprising the winding sections designated 4, 5 and 6, surrounds the stator which extends over the entire rotor.

Figure 2:
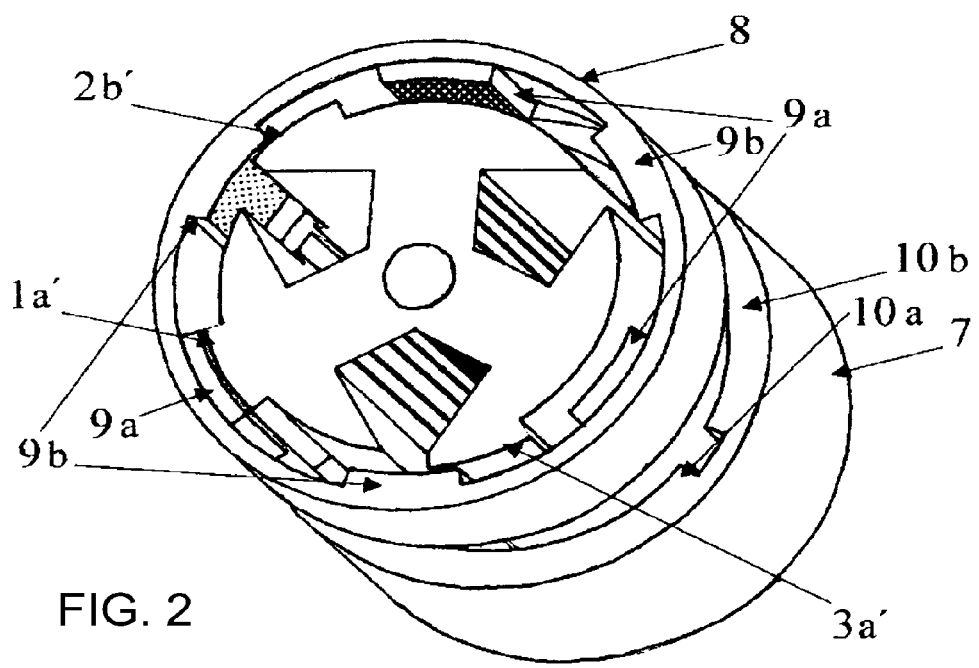
FIG. 2 is a perspective view thereof illustrated from a different viewing angle.

The partial section according to FIG. 2 shows the stator winding core in a partially installed state since it is surrounded by two rotating bells 7 and 8. At least one permanent magnet 10a, for example a north pole which acts in the inward direction, is stuck in place on the inner edge of the soft-magnetic bell 7, while the associated south pole is produced by a magnetic influence on the inside of the soft-magnetic bell 7. The same applies to the soft-magnetic bell 8 which is associated with the lower speed. In this case, three north poles 9a which act in the direction of the inside of soft-magnetic bell 8 are in turn stuck in place and the associated south poles 9b, which are each displaced through 60° in relation to the magnet positions, are produced by a magnetic influence.

Figure 3:
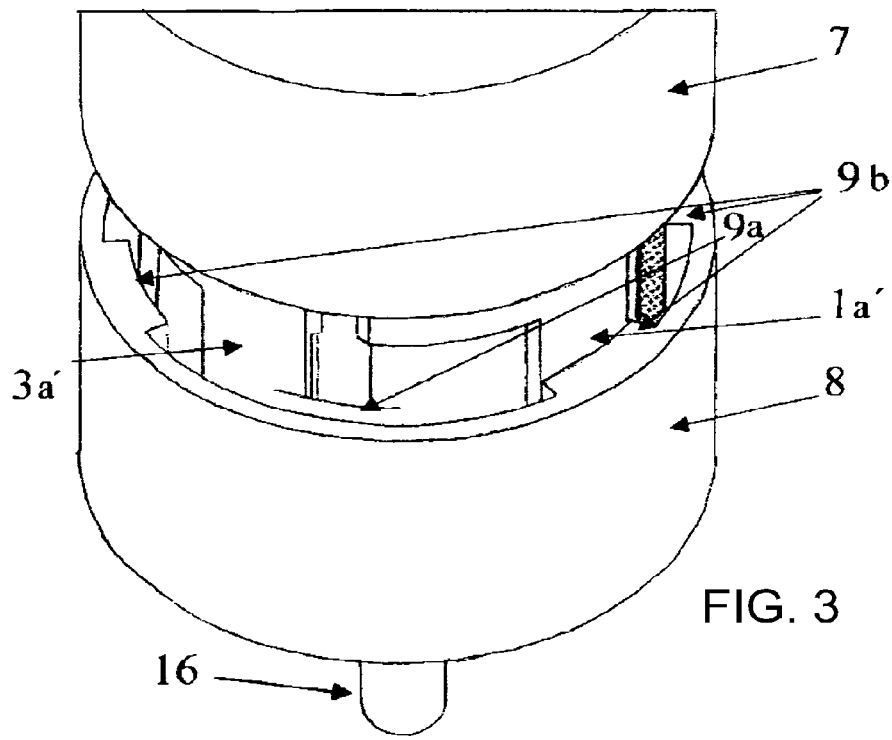
FIG. 3 is a partial side perspective view thereof.

FIG. 3 shows the stator and rotor in the assembled state, this also showing the shaft 16 which is associated with the lower speed and is firmly connected to the soft-magnetic bell 8. It is worth noting that the arrangement in question here has only 4 permanent magnets in total and, in the process, outputs two speeds.

Figure 4:
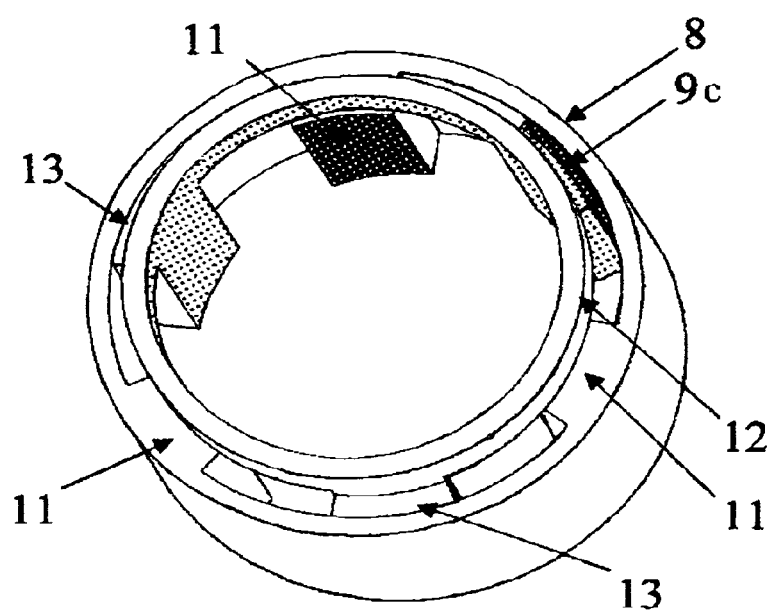
FIGS. 4 and 5 are perspective views showing a rotor design which makes do with just one single magnet in relation to the bell which is associated with the low rotation speed.

FIG. 4 shows a perspective cross section through a soft-magnetic bell 8 which is associated with the low speed and makes do with just one single permanent magnet 9c. This permanent magnet 9c rests, for example by way of its south pole, on the inner circumference of the soft-magnetic bell 8 which, for its part, ends in three circular segments 11 which are offset through 120° in each case and south poles are likewise created there by a magnetic influence. The north pole of this permanent magnet 9c rests against a lug of a soft-magnetic ring 12 which has two lugs which are offset through 120° or 240° and are supported against the inside of the soft-magnetic bell 8 on non-magnetic lining elements 13.

Figure 5:
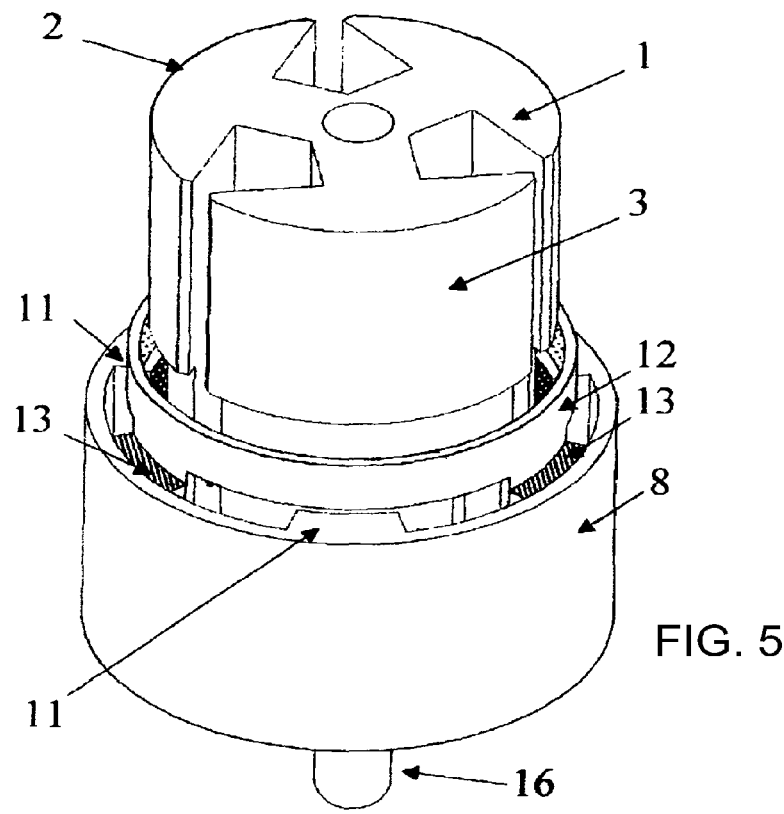

FIG. 5 shows an illustration of the stator with the yokes 1, 2 and 3 with a soft-magnetic bell 8 pushed over it. The segments 11, the soft-magnetic ring 12 with its lugs and the non-magnetic lining elements 13 can be seen.

Figure 6:
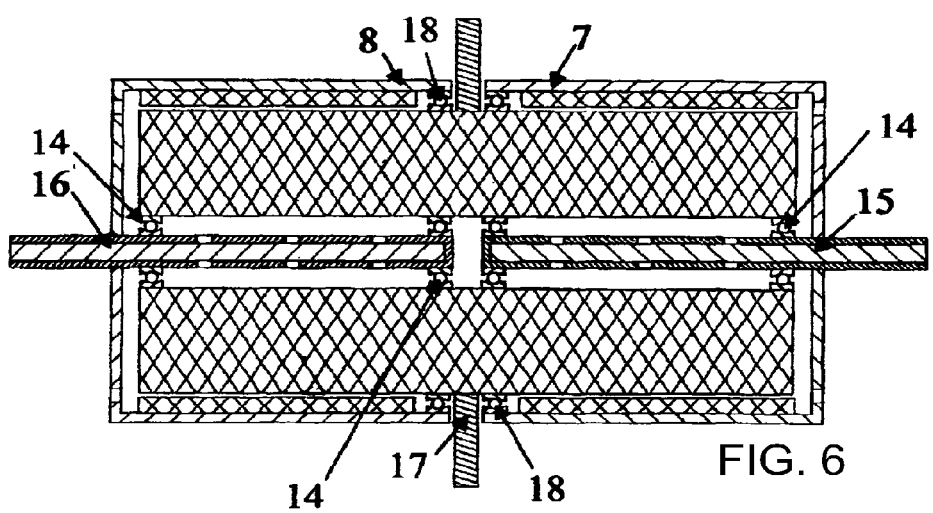
FIG. 6 is a sectional illustration of the general construction of the invention.

FIG. 6 illustrates a longitudinal section through the basic design. The flange 17 is fixed to the stator-side laminated core so that the entire motor is attached to it. The shafts 15 and 16 which are in the form of hollow shafts are rotatably mounted by means of the ball bearings 14 pressed into the laminated core. The rotor-side bells 7 and 8 are firmly connected to said shafts. In order to reduce tilting, it may be advantageous to support the bells 7 and 8 by two further bearings 18 which are seated on the outside of the laminated core. The hollow shafts 15 and 16 have at least one row of holes which have associated corresponding openings on the inside of the slot base of the stator and, in conjunction with further openings which are provided on the flat surfaces in the region between the magnet segments of the bells, serve to ventilate the stator windings 4, 5 and 6. It is expedient, for the purpose of increasing the pumping power, to form the stator yokes 1, 2 and 3 and 1a', 2a' and 3a' and the rotor magnets in a helical manner in such a way that the angle at which a magnet is stuck in the bell increases as the height of the bell increases. The angle at which the laminated cores and therefore the stator yokes are fitted to one another also increases in a linear fashion. FIG. 6 shows how this arrangement may be made suitable for three or four shafts too: only one additional ball bearing system is required on the shafts 15 and 16 for this purpose, said shafts accommodating on their other side the new bells on which the stator windings then act. Instead of additional ball bearings, the new bells could also be simply pushed onto the shafts 15 and 16.

Since 2001, a new type of electric motor, the so-called LRK motor (L=Lucas, R=Retzbach, K=Kühlfuß) motor of external rotor design which has six or twelve wound stator teeth has been used in airplane model construction. LRK motors have a high torque, a low running noise and a high degree of efficiency. In addition, these motors are virtually free of wear. These motors are driven by a brushless controller which converts the DC voltage of a drive battery into a three-phase AC voltage.

Figure 7:
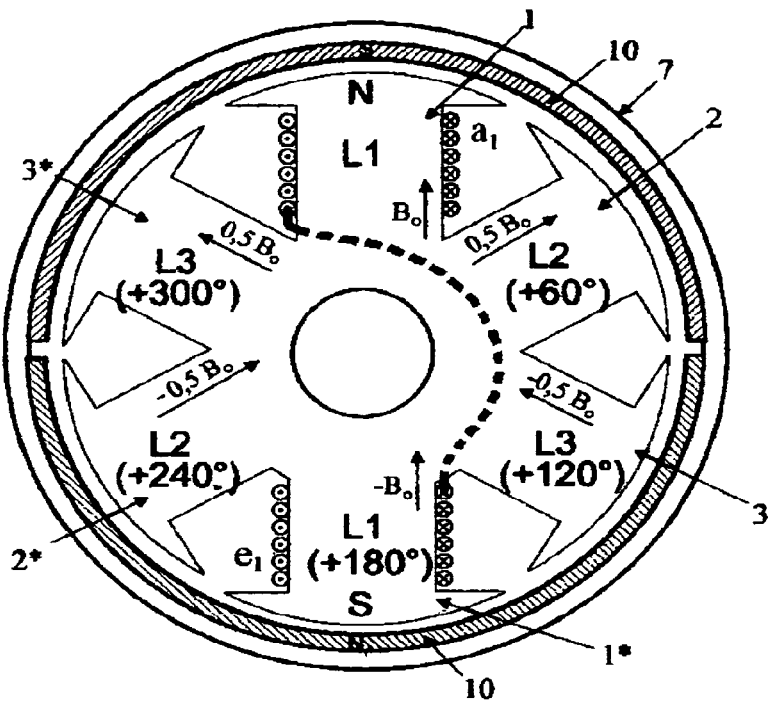
FIGS. 7 and 8 are partly schematic views of the stator windings in an LRK motor.
Figure 8:
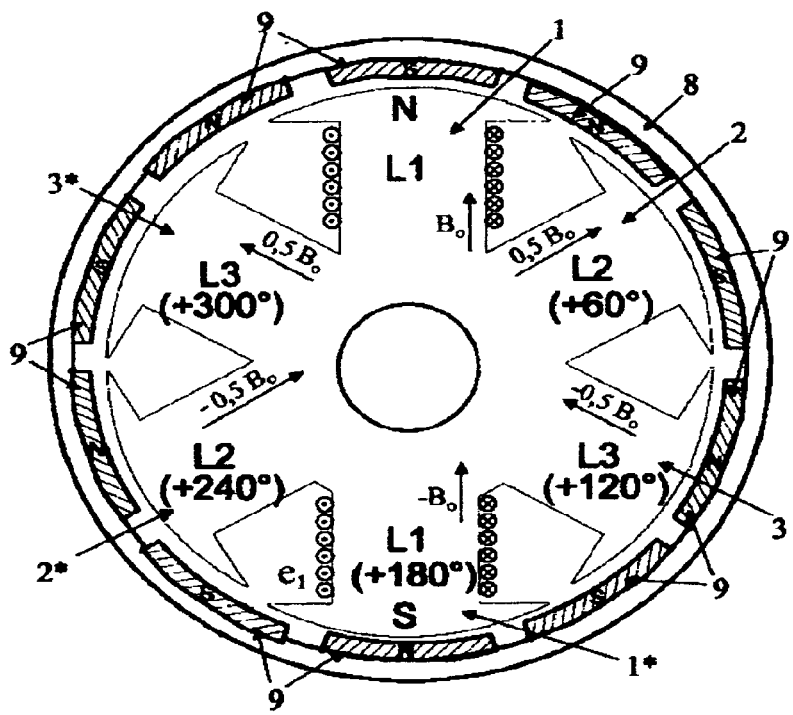

Such drives are highly suitable for the purposes of the invention since the stator armature geometry can remain the same under both bells and any desired differences in speed can be realized. FIGS. 7 and 8 illustrate two cross sections through an LRK motor. For example, FIG. 7, which has a bell with in each case a north pole and a south pole, corresponds to the shaft end associated with the higher speed, while FIG. 8, with in each case 5 north and south poles, corresponds to the shaft end with the lower speed. In the case of the stator teeth 1 and 1*, the winding direction is indicated between the winding ends labeled $a_1$ and $e_1$: a tip of an arrow marked with a dot indicates a flow of current emerging from the drawing area and an end of an arrow provided with a cross indicates a flow of current entering the drawing area. The same applies to the winding ends $a_2$ and $e_2$ and $a_3$ and $e_3$ for the stator teeth 2 and 2* and 3 and 3*. The armatures of the motors are designed to be completely identical, that is to say the sections 1*b'*, 2*b'* and 3*b'* in the region of the slowly rotating bell are dispensed with.

The windings of the individual armature segments are designed such that the magnetizations in the teeth 1 and 1\* generated by them are opposite, as viewed radially. The same applies to the teeth 2 and 2\* and the teeth 3 and 3\*. If the winding associated with the tooth 1 is subjected to throughflow to the maximum extent, a magnetic north pole with a flux density of $B_0$ is produced at the tooth 1 and, in contrast, a magnetic south pole with a flux density of $-B_0$ is produced at the tooth 1\*. The other armature windings are connected up to the two other phases of the three-phase current such that, in the same moment, the flux density changes for the other teeth in the clockwise direction by $\cos(\theta)$, that is to say the flux density $B_0 \cos(60°)=0.5 B_0$ in the tooth 2 and the flux density $B_0 \cos(120°)=-0.5 B_0$ in the tooth 3.

If the current phase now rotates through 60°, the tooth 2 becomes the north pole with a flux density of $B_0$, so that the two-pole bell 7 in FIG. 7 rotates through 60° on account of the attraction forces of the permanent magnet 10. When the phase rotates through 360°, the bell 7 has likewise executed a complete rotation through 360°. The speed of the two-pole bell 7 therefore corresponds to the speed of the alternating current. However, in contrast, the 10-pole bell according to FIG. 8 executes a rotary movement at a speed which is lower by a factor of 5. If, specifically at the time of the current phase of 60°, the tooth 2 becomes the north pole with a flux density of $B_0$, the bell magnet in the 72° position is drawn to the angle of 60° and the bell rotates only through 60°-72°=-12°, that is to say to the left. If the phase of the rotating field rotates through 360°, the bell then rotates through -6×12=-72°, so that the bell magnet which is located in the 72° position at the beginning of observation is now located in the zero position. If, for example, a 14-pole bell is used, a magnet is located on the bell every 360°/14=25.7° and a magnet of the same polarization direction is located on the bell every 360°/7=51.4°. In this refinement, the speed is reduced by a factor of 7.

Instead of using a bell with 2 magnetic poles in the arrangement according to FIG. 7, bells with a larger number of poles can also be used. Therefore, together with the embodiment shown in FIG. 8 which optionally has an n-pole bell, the speed is increased or decreased with any desired graduation.

Figure 9A:
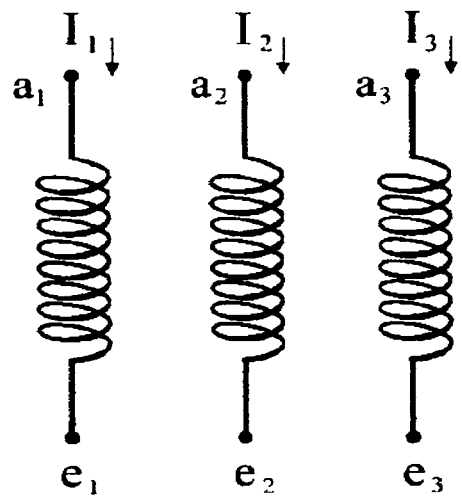
FIG. 9A is a partly schematic illustration showing details of the driving process of the stator coils.
Figure 9B:
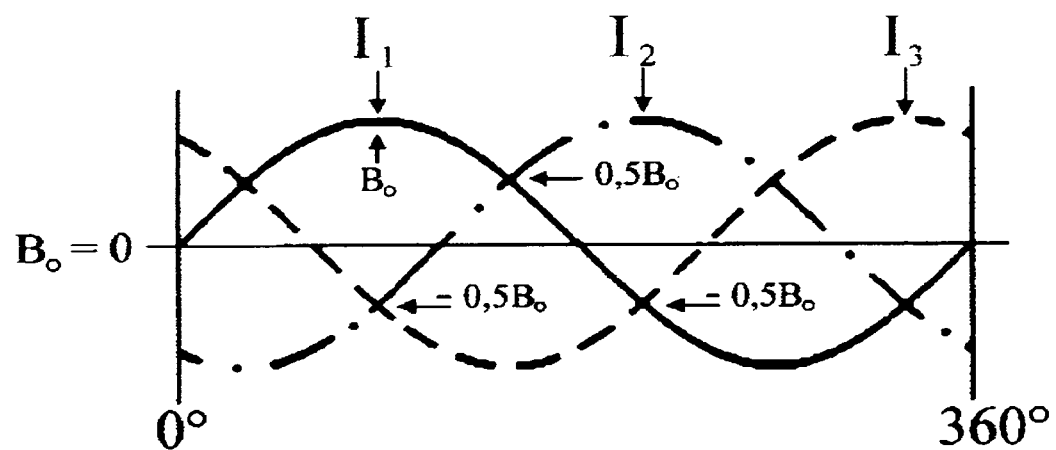
FIG. 9B is a graph representing details of the driving process of the stator coils.

FIGS. 9A and 9B show details of the driving process of the individual windings, where $a_1$ ($a_2$, $a_3$) identifies the start and $e_1$ ($e_2$, $e_3$) identifies the end of the first (second and third) winding. The same applies to the corresponding currents. The phase relationships could be achieved either by the connection to a customary three-phase supply system or else, as in the case of the abovementioned LRK motor, with a brushless controller which converts the DC voltage of a drive battery into a three-phase AC voltage. A mobile twin-motor drive which is independent of a three-phase supply system can be realized as a result. If the windings are short-circuited, or connected by means of a low-value resistor, this produces an electric gear mechanism in which a shaft is driven and then the correspondingly increased or reduced speed is collected at the other shaft end.

The invention claimed is:

1. A synchronous permanent magnet machine, comprising:
    a single stator carrying stator windings;
    at least two rotors for at least two rotation speeds of the machine, each of said rotors defining a separate rotation speed, and each of said rotors carrying permanent magnets with different numbers of poles;
    said stator windings of said single stator extending over all of said rotors; and
    means connected to said stator windings for subjecting said stator windings to a rotating field of a common frequency.

2. The apparatus according to claim 1, wherein at least one permanent magnet segment and at most p/2 permanent magnet segments of a common polarity are replaced by segments comprising a diamagnetic or ferromagnetic material of high permeability, where p is the pole number of said rotor.

3. The apparatus according to claim 1, wherein said rotors are configured in external rotor design, wherein a 2n-pole bell associated with a relatively low rotation speed has a single magnet connected at one end to a soft-magnetic bell which ends in n regularly offset yokes, and at an opposite end rests against a lug of a soft-magnetic ring which has n-1 further lugs disposed at 360/n° and supported against an inside of said bell on non-magnetic lining elements, where n is an integer.

4. The apparatus according to claim 3, which comprises hollow shafts connected to said bells, said hollow shafts having at least one row of holes formed therein, and further comprising means for ventilating the stator windings.

5. The apparatus according to claim 4, wherein said stator is formed with stator yokes and with regions into which said stator yokes recede, and wherein said regions are lined with non-magnetic material.

6. The apparatus according to claim 1, wherein said stator yokes and said rotor magnets are helical.

7. The apparatus according to claim 1, wherein said stator is connected up and driven to have a same absolute magnetization on an opposite side thereof.

8. In combination, the apparatus according to claim 1 and a radial suction machine with a centrifugal separator mounted on a low-speed side and a radial fan impeller mounted on a high-speed side.

9. The combination according to claim 8, which further comprises a brushless controller for supplying current to said stator windings.

10. In combination, the apparatus according to claim 1 and a brushless controller for supplying current to said stator windings.

11. The apparatus according to claim 1, wherein said stator windings are short-circuited to one another.

12. The apparatus according to claim 1, wherein said stator windings connected by way of a low-value resistor.

\* \* \* \* \*